United States Patent
Marentette

(10) Patent No.: US 7,281,512 B2
(45) Date of Patent: Oct. 16, 2007

(54) PASSIVELY VARIABLE PLENUM VOLUME FOR A VEHICLE INTAKE MANIFOLD ASSEMBLY

(75) Inventor: John Francis Marentette, Tecumseh (CA)

(73) Assignee: Siemens VDO Automotive, Inc. (CA)

( * ) Notice: Subject to any disclaimer, the term of this patent is extended or adjusted under 35 U.S.C. 154(b) by 475 days.

(21) Appl. No.: 10/601,450

(22) Filed: Jun. 23, 2003

(65) Prior Publication Data

US 2004/0255892 A1 Dec. 23, 2004

(51) Int. Cl.
*F02M 35/10* (2006.01)
(52) U.S. Cl. .............................. 123/184.54; 123/184.21
(58) Field of Classification Search ........... 123/184.21, 123/184.51, 184.54; 60/602
See application file for complete search history.

(56) References Cited

U.S. PATENT DOCUMENTS

| | | | |
|---|---|---|---|
| 3,576,102 A * | 4/1971 | West ............................ | 60/602 |
| 4,094,284 A * | 6/1978 | Gesell ......................... | 123/444 |
| 4,180,041 A * | 12/1979 | Miyazaki et al. ............ | 123/590 |
| 4,286,433 A * | 9/1981 | Detweiler .................... | 60/602 |
| 4,368,698 A | 1/1983 | Matsuo et al. | |
| 4,423,706 A | 1/1984 | Onodera | |
| 4,617,897 A | 10/1986 | Sasaki et al. | |
| 4,928,638 A * | 5/1990 | Overbeck .............. | 123/184.56 |
| 4,928,639 A * | 5/1990 | Schatz ................... | 123/184.54 |
| 4,986,225 A * | 1/1991 | Wu et al. ............... | 123/184.54 |
| 5,009,199 A | 4/1991 | MacFarlane | |
| 5,638,785 A | 6/1997 | Lee | |
| 5,653,202 A | 8/1997 | Ma | |
| 5,687,684 A | 11/1997 | Verkleeren | |
| 5,704,327 A | 1/1998 | Dohring | |
| 5,715,781 A | 2/1998 | Martinelli | |
| 5,890,464 A | 4/1999 | Martinelli | |
| 5,950,587 A | 9/1999 | Sattler et al. | |
| 6,161,513 A | 12/2000 | Lohr et al. | |
| 6,209,502 B1 | 4/2001 | Davis et al. | |
| 6,260,528 B1 | 7/2001 | Pringle et al. | |
| 6,302,076 B1 | 10/2001 | Bredy | |
| 6,308,686 B1 | 10/2001 | Mammarella et al. | |
| 6,314,949 B1 | 11/2001 | DeGrazia, Jr. et al. | |
| 6,684,841 B2 * | 2/2004 | Ekstrom ................ | 123/184.21 |
| 2001/0013675 A1 * | 8/2001 | Nakagawa et al. ......... | 264/513 |

FOREIGN PATENT DOCUMENTS

| JP | 56-148613 | * 11/1981 |
|---|---|---|
| JP | 59-40931 | * 3/1984 |

\* cited by examiner

*Primary Examiner*—Carl S. Miller
(74) *Attorney, Agent, or Firm*—Carlson Gaskey & Olds PC

(57) ABSTRACT

An intake manifold assembly (10) includes a plenum (14) and a variable volume assembly (20). The variable volume assembly (20) includes a deformable member (22) and a biasing member (24). The biasing member (24) positions the deformable member (22) at a predetermined position in response to a vacuum pressure within the plenum (14) to define a volume within the deformable member (22) to change the operational characteristics of the intake manifold assembly (10).

1 Claim, 1 Drawing Sheet

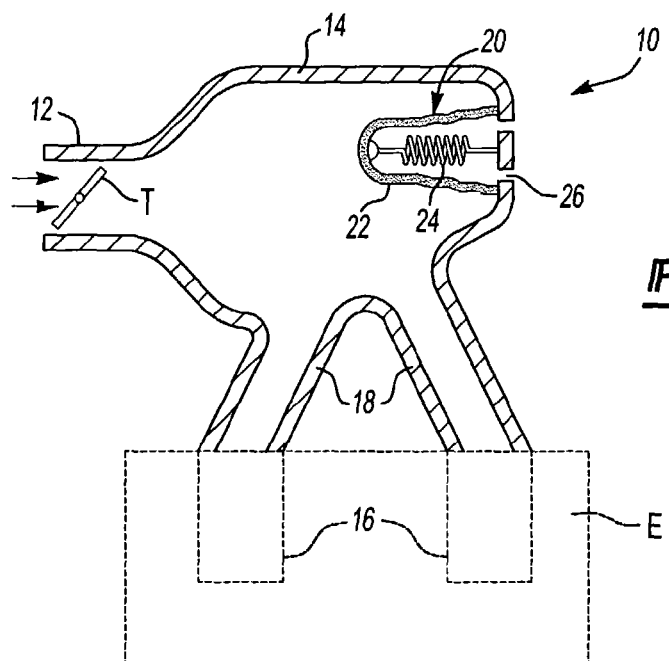
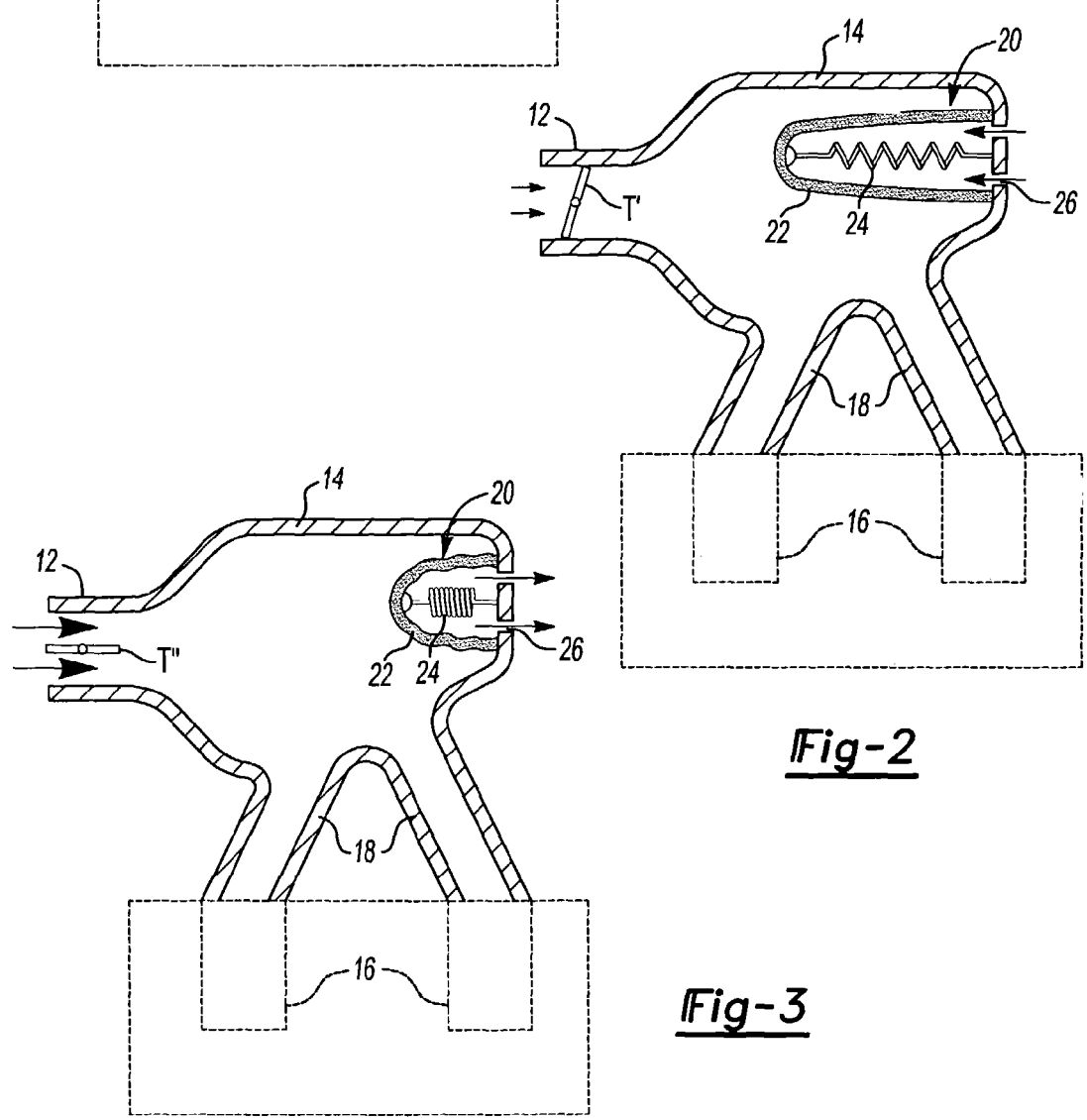

PASSIVELY VARIABLE PLENUM VOLUME FOR A VEHICLE INTAKE MANIFOLD ASSEMBLY

BACKGROUND OF THE INVENTION

The present invention relates to a vehicle intake manifold, and more particularly to an intake manifold having an adjustable plenum to provide variable tuning during engine operation.

An air intake manifold of a multi-cylinder engine is a branched pipe arrangement which connects the valve ports of each cylinder with an air inlet. The manifold may have considerable effect on engine performance. The intermittent or pulsating nature of the airflow through the manifold into each cylinder may develop resonances in the airflow at certain speeds. These may increase the volumetric efficiency and, thus, the power at certain engine speeds, but may reduce such efficiency at other speeds, depending on manifold dimensions and shape.

Conventional intake manifolds for vehicles have a fixed air flow geometry. With a fixed intake system, the speed at which intake tuning occurs is also fixed. Since the engine operates over a broad RPM range and since a different geometry may be ideal for different engine speeds, fixed geometry intake systems are designed with a geometry which is optimal for only a limited range of engine speeds. The intake may be typically designed as a compromise between torque at low speeds and horsepower at high speeds.

Various designs for variable intake geometry have met with varying degrees of success. Each of these conventional variable intake manifolds may be rather complex and expensive to produce. Difficulty in servicing and a limited range of variable tuning may also be disadvantageous design results of conventional variable intake manifolds.

Accordingly, it is desirable to provide a cost effective and uncomplicated variable intake manifold which will still maximize the variable tuning available during engine operation.

SUMMARY OF THE INVENTION

The intake manifold assembly according to the present invention includes a plenum volume and a variable volume assembly. The variable volume assembly includes a deformable member and a resilient member. The resilient member positions the deformable member at a predetermined position in response to a vacuum pressure within the plenum to define a volume within the deformable member to change the operational characteristics of the intake manifold assembly.

In operation, at low engine speeds, a relatively closed throttle creates a relatively high vacuum pressure within the plenum which expands the volume of the deformable member thereby essentially reducing the volume within the plenum. The decreased volume within the plenum 14 provides improved dynamic control, idle quality and "start flare". At high engine speeds, a relatively open throttle creates a relatively low vacuum pressure within the plenum. The relatively low vacuum pressure within the plenum permits the resilient member to overcome the pressure which essentially increases the volume within the plenum. The increased volume within the plenum provides augmented high speed dynamic operation for maximum speed operation.

The present invention therefore provides a cost effective and uncomplicated variable intake manifold which will still maximize the variable tuning available during engine operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a side partially sectional view of an intake manifold assembly according to the present invention in a first position;

FIG. 2 is a side partially sectional view of an intake manifold assembly according to the present invention in a low speed position; and FIG. 3 is a side partially sectional view of an intake manifold assembly according to the present invention in a high speed position.

DETAILED DESCRIPTION OF THE PREFERRED EMBODIMENT

FIG. 1 illustrates a general schematic side view of an intake manifold assembly 10 which communicates with an engine E. The assembly 10 generally includes an intake conduit 12 which communicates airflow to a plenum 14 which contains a variable volume assembly 20. As generally known, the plenum 14 receives intake airflow through the intake conduit 12 from a throttle assembly, vehicle intake, or the like. Airflow from the plenum 14 is distributed to each of a multiple of engine cylinders (illustrated schematically at 16) through a respective runner passage 18. That is, each cylinder 16 preferably receives airflow from the plenum 14 through its own runner passage 18.

The variable volume assembly 20 includes a deformable member 22 and a biasing member 24. The deformable member 22 preferably includes a flexible member, a bellows structure, a telescoping structure or the like which permits a change in volume in response to a vacuum pressure within the plenum 14. The biasing member 24 is preferably a spring or the like which positions the deformable member at a predetermined position in response to a vacuum pressure within the plenum 14 to define a volume within the deformable member 22.

The variable volume assembly 20 includes an aperture 26 which is preferably open to atmosphere to provide a reference pressure to the pressure within the plenum 14. That is, the deformable member 22 responds to the differential pressure between the pressure within the plenum 14 as compared to that within the deformable member 22 which is preferably equivalent to atmospheric pressure. It should be understood that the biasing member 24 provides a predetermined relationship between the volume of the deformable member 22 relative the pressure within the plenum 14. The aperture 26 may alternatively be in communication with an active pressure source to provide active control of the variable volume assembly 20.

In operation, at low engine speeds, a relatively closed throttle (illustrated schematically at T') creates a relatively high vacuum pressure within the plenum 14. The relatively high vacuum pressure within the plenum 14 essentially expands the volume of the deformable member 22 (FIG. 2) relative a predetermined volume position (FIG. 1) thereby essentially reducing the volume within the plenum 14. The decreased volume within the plenum 14 provides improved dynamic control, idle quality and "start flare".

At high engine speeds, a relatively open throttle (illustrated schematically at T") creates a relatively low vacuum pressure within the plenum 14. Such a relatively low vacuum pressure is typically relatively close to atmospheric pressure. The relatively low vacuum pressure within the plenum 14 permits the biasing member 24 to overcome the pressure within the plenum 14. The volume of the deformable member 22 (FIG. 3) is essentially decreased relative the predetermined volume position (FIG. 1) thereby essentially increasing the volume within the plenum 14. The increased volume within the plenum 14 provides improved high speed dynamic operation for maximum speed operation.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of adjusting a volume within a vehicle intake manifold assembly comprising the steps of:
   (1) communicating a plenum volume with an engine pressure;
   (2) communicating a deformable member within the plenum with an atmospheric pressure such that a differential pressure therebetween inflates and deflates the deformable member in response thereto to vary a volume of the deformable member which respectively varies the volume within the plenum, the deformable member resiliently mounted within the plenum; and
   (3) contracting the deformable member with a resilient member in response to the differential pressure being substantially equivalent to atmospheric pressure.

* * * * *